(12) United States Patent  (10) Patent No.: US 7,736,160 B2
Stöckel  (45) Date of Patent: Jun. 15, 2010

(54) DISTRIBUTOR CONNECTION MODULE

(75) Inventor: Manfred Stöckel, Berlin (DE)

(73) Assignee: ADC GmbH, Berlin (DE)

( * ) Notice: Subject to any disclaimer, the term of this patent is extended or adjusted under 35 U.S.C. 154(b) by 589 days.

(21) Appl. No.: 11/718,697

(22) PCT Filed: Oct. 31, 2005

(86) PCT No.: PCT/EP2005/011640

§ 371 (c)(1),
(2), (4) Date: May 4, 2007

(87) PCT Pub. No.: WO2006/048222

PCT Pub. Date: May 11, 2006

(65) Prior Publication Data

US 2009/0075492 A1   Mar. 19, 2009

(30) Foreign Application Priority Data

Nov. 5, 2004 (DE) ............... 10 2004 054 533

(51) Int. Cl.
*H01R 13/44* (2006.01)
(52) U.S. Cl. .................. 439/142; 439/93; 439/488; 439/892
(58) Field of Classification Search .......... 439/44, 439/49, 61, 93, 113, 315, 488, 142, 620.15, 439/892
See application file for complete search history.

(56) References Cited

U.S. PATENT DOCUMENTS

| 4,605,275 | A | * | 8/1986 | Pavel | 439/540.1 |
| 4,749,359 | A | * | 6/1988 | White | 439/133 |
| 4,782,427 | A | * | 11/1988 | Marks | 361/824 |
| 5,103,378 | A | * | 4/1992 | Stowers et al. | 361/802 |
| 5,637,011 | A | | 6/1997 | Meyerhoefer et al. | |
| 5,888,079 | A | * | 3/1999 | Norden | 439/142 |
| 6,795,552 | B1 | * | 9/2004 | Stanush et al. | 379/413.01 |
| 7,131,845 | B2 | | 11/2006 | Mueller et al. | |
| 7,507,097 | B2 | * | 3/2009 | Stockel | 439/159 |
| 2004/0106313 | A1 | * | 6/2004 | Drane et al. | 439/142 |
| 2006/0114660 | A1 | | 6/2006 | Busse et al. | |
| 2008/0108236 | A1 | * | 5/2008 | Stockel | 439/159 |
| 2009/0075492 | A1 | * | 3/2009 | Stockel | 439/44 |

(Continued)

FOREIGN PATENT DOCUMENTS

DE    79 18 338  U1    3/1980

(Continued)

OTHER PUBLICATIONS

Anschluss—and Verteiltechnick: 3M Telecommunications Solutions for Networks. 2002.

*Primary Examiner*—James Harvey
(74) *Attorney, Agent, or Firm*—Merchant & Gould P.C.

(57) ABSTRACT

The invention relates to a distributor connection module used in the telecommunication and data technology field. Said distributor connection module comprises a housing which comprises a cavity wherein at least two conductor plates are arranged, and the housing comprises at least one opening in a front side wherein two connector modules can be inserted. A pivotable protection frame is arranged on the housing, which can adopt at least two positions. In a first pivoted position, the connector module is free and in a second position, the protection frame is arranged in a parallel manner in relation to the front side.

16 Claims, 6 Drawing Sheets

U.S. PATENT DOCUMENTS

2009/0163046 A1 *  6/2009  Stockel ................. 439/61

FOREIGN PATENT DOCUMENTS

| DE | 34 15 872 A1 | 10/1985 |
|---|---|---|
| DE | 102 10 382 C1 | 10/2003 |
| DE | 102 57 308 B3 | 1/2004 |
| DE | 102 36 361 A1 | 3/2004 |
| EP | 0 338 598 A2 | 10/1989 |
| FR | 2 665 044 | 1/1992 |

* cited by examiner

DISTRIBUTOR CONNECTION MODULE

TECHNICAL FIELD

The invention relates to a distribution board connection module for telecommunications and data technology.

BACKGROUND

DE 102 36 361 A1 discloses a distribution board connection module for telecommunications and data technology, comprising a housing, in which input and output contacts are arranged such that they are accessible from the outside for the purpose of connecting lines and cables, the housing being formed with a cavity, in which at least one printed circuit board is arranged, the input and output contacts being arranged on the opposing end faces of the housing, the input contacts being associated with an input side, and the output contacts being associated with an output side, the input contacts being in the form of at least two opposing rows of contacts, and the output contacts being in the form of at least one plug-in connector. The input contacts are in this case in the form of connector modules, which have contact elements which each have an insulation-displacement contact and a fork contact, the latter being used to produce the electrical and mechanical contact with the printed circuit board. One possible design for the connector modules is described in DE 102 57 308 B3.

DE 102 10 382 C1 discloses an apparatus for providing access protection for at least two distribution board modules in telecommunications and data technology, each distribution board module being formed with at least one system side and one subscriber side, each connection side being provided with at least one row of insulation-displacement contact elements, it being possible for the distribution board modules to be placed on a mounting frame and for at least one access to the system sides to be protected by at least one first latching device, at least one access to the subscriber sides being protected by at least one second latching device, it being possible for the access protection to the subscriber side of at least one distribution board module to be released independently of the other distribution board modules, and the distribution board modules being connected fixedly to the mounting frame by the first latching device. In this case, access to at least one connection side of the distribution board module can be protected by a display frame, it being possible for the display frame to be protected by means of a second latching device. In this case, the display frame which may be written on almost completely covers the end face of the distribution board module.

SUMMARY

The invention is based on the technical problem of providing a generic distribution board connection module having a display frame.

For this purpose, a display frame, which can be pivoted, is arranged on the housing, it being possible for the display frame, which can be pivoted, to assume at least two positions, the connector modules being freely accessible in a first pivoted-up position, and the display frame being arranged parallel to the end face in a second position. In this case, freely accessible means that the connector modules are connected and/or can be removed from the housing. However, this does not rule out the possibility of at least individual contacts or a connector module also not being accessible in the position in which the display frame is parallel to the end face. The advantage of a display frame, which can be pivoted, compared to a plugged-on display frame is the fact that, when cables are connected or when a connector module is removed, the display frame remains on the housing, with the result that it cannot be lost.

In one preferred embodiment, the display frame is arranged centrally between the connector modules in the second position.

In a further, preferred embodiment, brackets are arranged laterally on the display frame, an attachment being arranged on the inside of each bracket and engaging in each case in a pivot bearing arranged on the housing.

In a further, preferred embodiment, the attachment is cylindrical, the pivot bearings preferably being in the form of plates, perpendicular to the end face, having an opening in which the attachments of the brackets engage. Alternatively, the pivot bearings may be cylindrical, in this case it being possible for corresponding clamps to be arranged on the bracket.

In a further, preferred embodiment, at least one latching element is arranged on the inside of each bracket, said latching element latching in latching troughs in the pivot bearing in the respective first and second position.

In a further, preferred embodiment, the latching elements are rhombic.

In a further, preferred embodiment, the latching troughs are arranged in the form of rectangular depressions on the outside of the plates. In this case, two respective parallel edges of the rhombus latch into the rectangular latching trough in each position.

In a further, preferred embodiment, the rectangular depression for the first pivoted-up position is shorter than for the second position.

In a further, preferred embodiment, the housing is of at least two-part design, comprising a base part and a front part, the front part forming the end face bearing the connector modules. Further preferably, the display frame is arranged on the front part such that it can pivot.

In a further, preferred embodiment, U-shaped elevations are arranged on the housing on the end face to the side of the connector modules. Said U-shaped elevations act as opposing bearings for a lever, in order to lever the connector modules out of the opening in the end face. In this case, the base acts as a bearing, and the limbs act as guides for the tool. Further preferably, the base is in this case slightly shorter or flatter than the limbs, so as to prevent lateral sliding-off.

In a further, preferred embodiment, the base of the elevation is beveled inwards, which further improves the guidance of the lever tool.

In a further, preferred embodiment, the connector modules are formed with lateral openings, which are preferably arranged in the region of the U-shaped elevations. A lever tool can then be inserted in the opening, the lever tool then resting on the base part of the elevation as a lever bearing.

BRIEF DESCRIPTION OF THE DRAWINGS

The invention will be explained in more detail below with reference to a preferred exemplary embodiment. In the figures.

DETAILED DESCRIPTION

Figure 1:
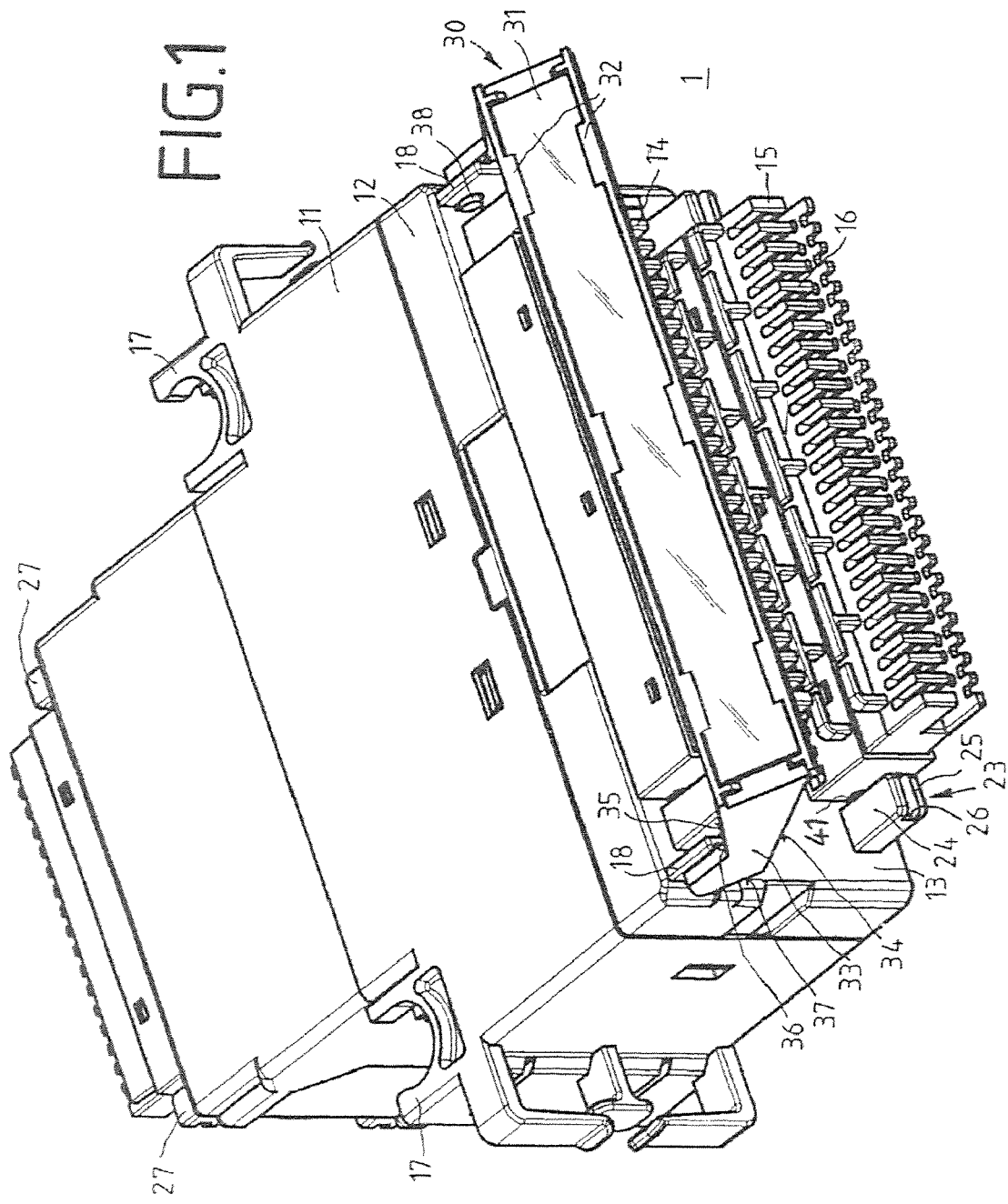
FIG. 1 shows a perspective front view of a distribution board connection module with a pivoted-up display frame.

The distribution board connection module 1 comprises a first housing part 11 (base part) and a second housing part 12 (front part), which are latched to one another and form a housing 10. The housing 10 has a cavity, in which at least two printed circuit boards are arranged. Furthermore, the second housing part 12, which defines the end face 13, has two openings in each of which a connector module 14, 15 is arranged. The connector modules 14, 15 themselves likewise have a two-part housing. The connector modules 14, 15 each have a row of contact elements which are formed with two contacts, an insulation-displacement contact 16 which is accessible from outside the housing 10 and an inwardly pointing fork contact, by means of which the contact element electrically and mechanically connects the printed circuit board. The contact elements are in this case supported in the housing of the connector module 14, 15 such that they can absorb the connection forces occurring when contact is made with the cables in the insulation-displacement contacts 16. Furthermore, the first housing part 11 has arched attachments 17, by means of which the distribution board connection module 1 can be latched onto round rods (not shown) of a mounting frame. The end face opposite the end face 13 preferably likewise has openings, through which further connector modules can be pushed. These connector modules may have the same design as the connector modules 14, 15 or may be in the form of multi-pin plug-in connectors. Two plates 18, which are perpendicular to the end face 13, are arranged in the upper region on the end face 13. The plates 18 each have a rounded-off opening 19 and two rectangular depressions 20, 21 (see FIG. 3). In this case, the depression 20 is slightly shorter than the depression 21, i.e. the depression 21 extends slightly more in the direction of the end face 13.

Figure 4:
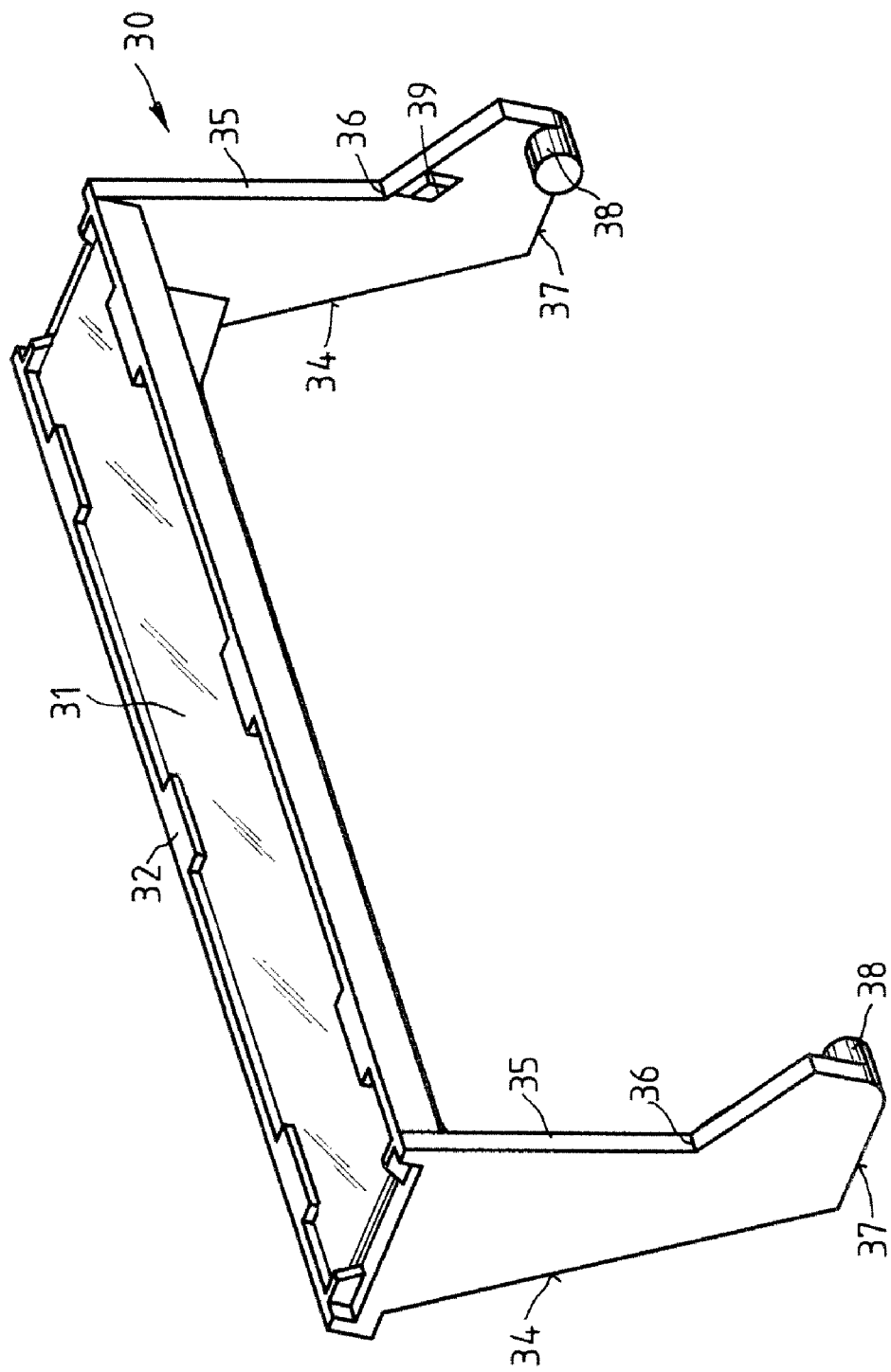
FIG. 4 shows a perspective partial view of a display frame.

A display frame 30 comprises a label area, which is flat and is preferably covered by a transparent plastic strip 31, which can be pushed below webs 32. Two brackets 33 are arranged laterally on the label area. In this case, a lower edge 34 of the bracket 33 extends upwards uniformly at an angle, whereas an upper edge 35 initially has a slightly less steep incline, which initially results in a tapering of the bracket 33 (see FIG. 2). At a bend 36, the edge 35 then rises with more of an incline in order to then make the transition to a flat region. In the position shown in FIG. 2, in this case the rear edge 37 of the bracket is parallel to the end face 13 and is supported by a stop 22 of the housing part 12. In the region of the bend 36, a latching element 39 (see FIG. 4), which is preferably rhombic, is arranged on the inside of the bracket 33. In the region of the flat part of the edge 35, a cylindrical attachment 38 is arranged on the inside and engages in the opening 19 in the plate 18.

Figure 3:
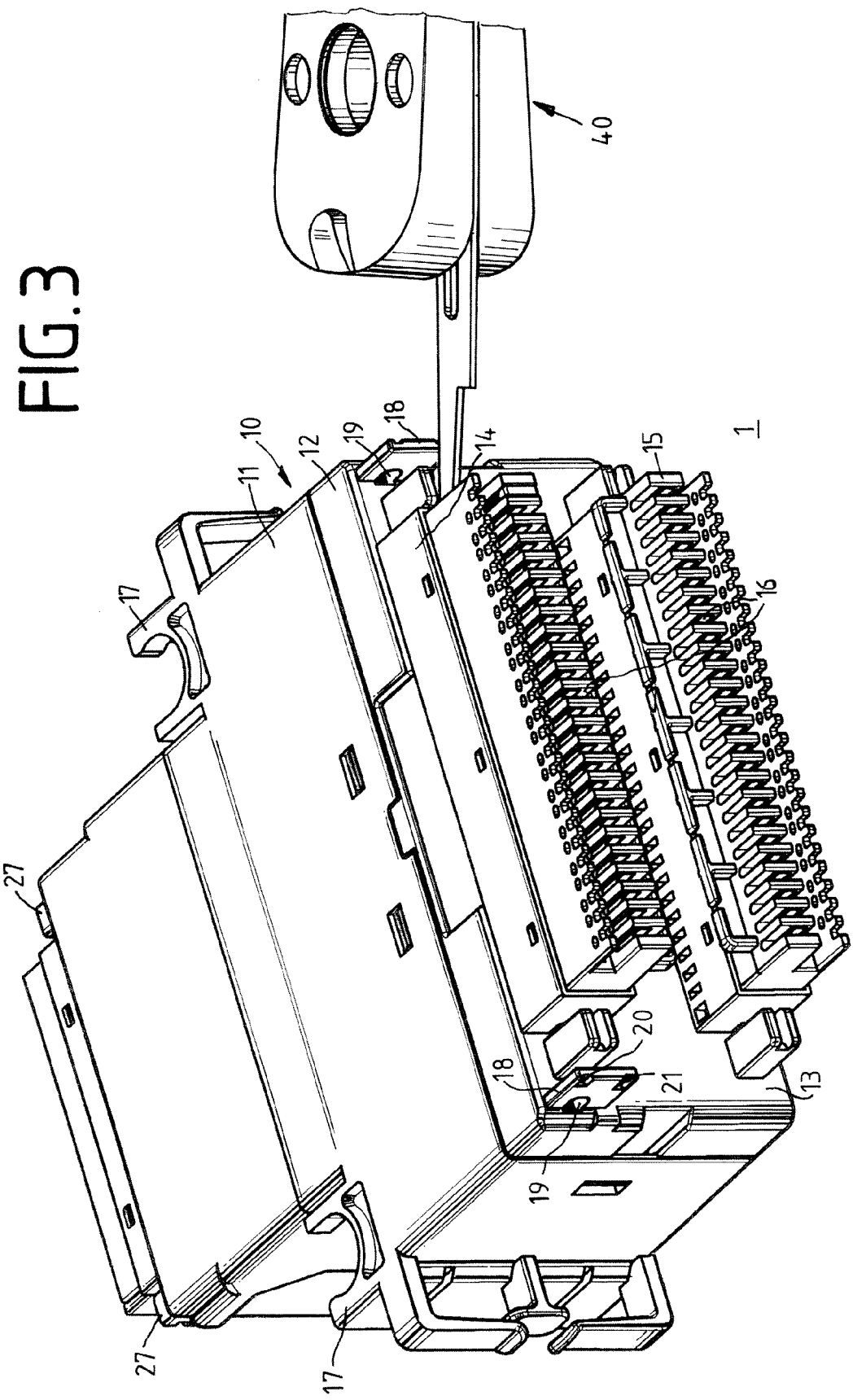
FIG. 3 shows a perspective front view without the display frame but with a lever tool.
Figure 5:
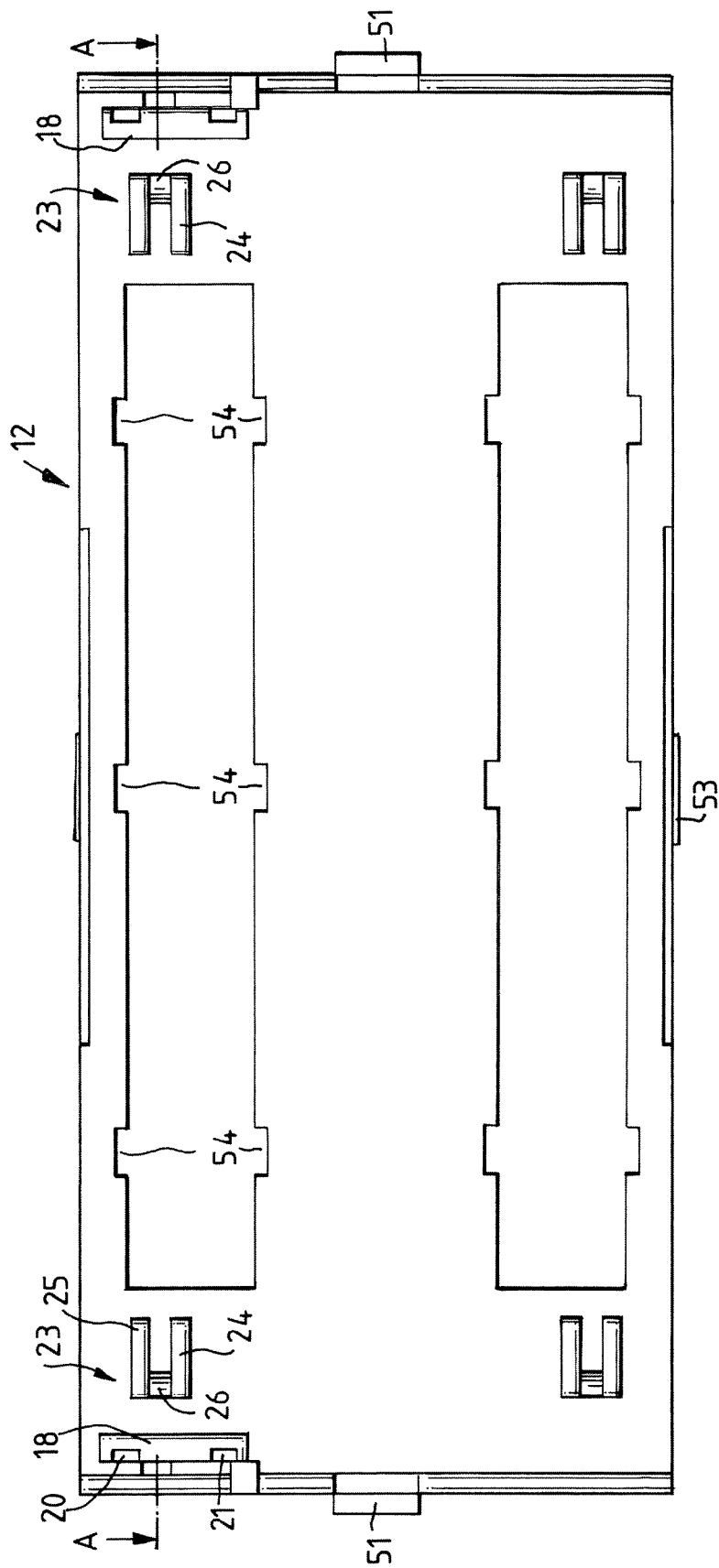
FIG. 5 shows a perspective illustration of a connector module.

Furthermore, the second housing part 12 is formed with four U-shaped elevations 23. The U-shaped elevations 23 are each arranged laterally next to the openings for the connector modules 14, 15 and likewise stand perpendicularly on the end face 13. Each U-shaped elevation comprises two limbs 24, 25 and a base part 26, the base part 26 being shorter than the limbs 24, 25. Furthermore, the base part 26 is beveled inwards. This forms an inwardly inclined slot. In the line aligned with this beveled slot, the connector modules 14, 15 have an opening 41 (see FIG. 5), such that a lever tool 40 can be guided in the slot, the front part of the lever tool 40 passing into the opening 41 of the connector module 14, 15. In this case, the base part 26 forms a lever bearing, with the result that the latched-in connector module 14, 15 which has been pushed onto the printed circuit board can be levered out, as is illustrated in FIG. 3. As regards the precise design of the connector modules 14, 15, express reference is made to DE 102 57 308 B3, express reference hereby being made thereto.

FIG. 1 shows the display frame 30 in a first pivoted-up position. In this case, the latching elements of the brackets 33 are latched into the rectangular depression 20. In this position, the two connector modules 14, 15 can be connected or else levered out.

Figure 2:
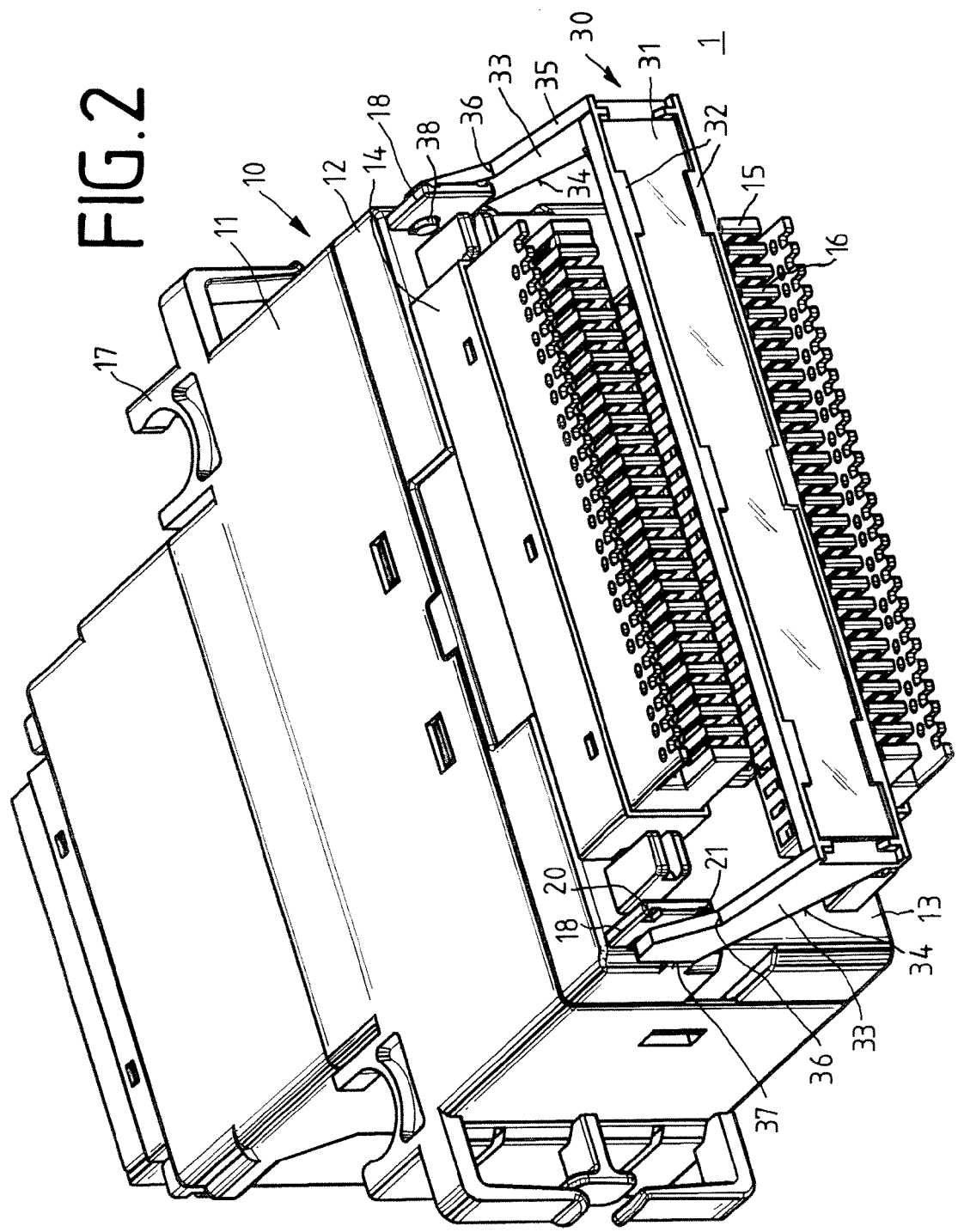
FIG. 2 shows a perspective front view with the display frame in a second position.

FIG. 2 shows the display frame 30 in a second, folded-down position, the display frame 30 being arranged centrally between the connector modules 14, 15. In this case, the latching elements of the brackets 33 are latched into the rectangular depressions 21, the label area being parallel to the end face 13. In this position, connection of cables or release is impeded by the display frame 30.

On the end face opposite the end face 13, it is possible to see elevations 27 which are likewise U-shaped and by means of which it is likewise possible for connector modules to be levered out. In this case, the U-shaped elevations 27 are slightly shorter than the U-shaped elevations 23. The U-shaped elevations 23 need to be slightly higher, since they need to be higher than the plates 18. In this case, however, it would be possible for the two U-shaped elevations 23 to be shorter where there are no plates 18 arranged, since this makes levering out easier.

Figure 6:
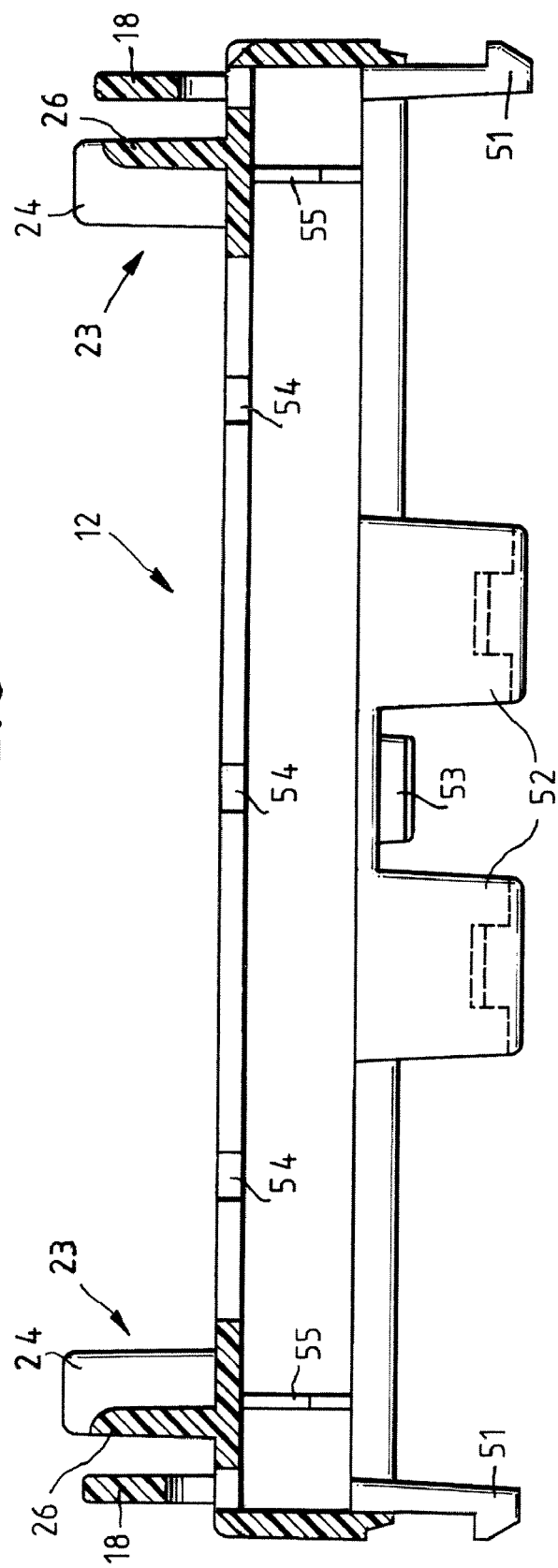
FIG. 6 shows a sectional illustration through the second housing part.

FIG. 6 shows a sectional illustration through the second housing part 12 (front part), the section A-A (see FIG. 5) having been drawn through the two base parts of the U-shaped elevation 23. The housing part 12 has various latching hooks 51, 52 and 53, by means of which the housing part 12 can be latched to the first housing part 11. Furthermore, three recesses 54 and a part 55 of a supporting element for the printed circuit board (not shown) can be seen. The recesses are cutouts for latching lugs of the connector modules 14, 15 which prevent any latching-in.

LIST OF REFERENCE NUMERALS

1 Distribution board connection module
10 Housing
11 Housing part (base part)
12 Housing part (front part)
13 End face
14, 15 Connector module
16 Insulation-displacement contact
17 Arched attachments
18 Plates
19 Opening
20, 21 Rectangular depressions
23 U-shaped elevations
24, 25 Limbs
26 Base part
27 U-shaped elevations
30 Display frame
31 Plastic strip
32 Webs
33 Brackets
34 Lower edge
35 Upper edge
36 Bend
37 Rear edge
38 Cylindrical attachment
39 Latching element

40 Lever tool
41 Opening
51, 52, 53 Latching hooks
54 Recesses
55 Part of a supporting element

The invention claimed is:

1. A distribution board connection module for telecommunications and data technology, comprising:
a housing, the housing being formed with a cavity, in which at least two printed circuit boards are arranged, the housing having at least one opening in an end face, in which two connector modules can be inserted,
wherein
a display frame, which can be pivoted, arranged on the housing, it being possible for the display frame, which can be pivoted, to assume at least two positions, the connector modules being freely accessible in a first pivoted-up position, and the display frame being arranged parallel to the end face in a second position.

2. The distribution board connection module as claimed in claim 1, wherein the display frame is arranged centrally between the connector modules in the second position.

3. The distribution board connection module as claimed in claim 1, wherein brackets are arranged laterally on the display frame, an attachment being arranged on an inside of each bracket and engaging in each case in a pivot bearing arranged on the housing.

4. The distribution board connection module as claimed in claim 3, wherein the attachment is cylindrical.

5. The distribution board connection module as claimed in claim 3, wherein the pivot bearings are in the form of plates, perpendicular to the end face, having an opening.

6. The distribution board connection module as claimed in claim 3, wherein at least one latching element is arranged on the inside of each bracket, said latching element latching in latching troughs in the pivot bearing in the respective first and second position.

7. The distribution board connection module as claimed in claim 6, the latching elements are rhombic.

8. The distribution board connection module as claimed in claim 6, wherein the latching troughs are arranged in the form of rectangular depressions on an outside of plates forming the pivot bearings.

9. The distribution board connection module as claimed in claim 8, wherein the rectangular depression for the first pivoted-up position is shorter than the rectangular depression for the second position.

10. The distribution board connection module as claimed in claim 1, wherein the housing is of at least two-part design, comprising a base part and a front part, the front part forming the end face bearing the connector modules.

11. The distribution board connection module as claimed in claim 10, wherein the display frame is arranged on the front part such that it can pivot.

12. The distribution board connection module as claimed in claim 1, wherein U-shaped elevations, comprising two limbs and a base part, are arranged on the housing to the side of the connector modules.

13. The distribution board connection module as claimed in claim 12, wherein the base part of the elevation is shorter than the limbs.

14. The distribution board connection module as claimed in claim 12 wherein the base part is beveled inwards.

15. The distribution board connection module as claimed in claim 12, wherein the connector modules are formed with lateral openings.

16. The distribution board connection module as claimed in claim 15, wherein the openings are arranged in a region of the U-shaped elevations.

* * * * *